United States Patent
Fung et al.

(10) Patent No.: US 7,380,155 B2
(45) Date of Patent: *May 27, 2008

(54) SYSTEM FOR HIGHLY AVAILABLE TRANSACTION RECOVERY FOR TRANSACTION PROCESSING SYSTEMS

(75) Inventors: Priscilla C. Fung, Union City, CA (US); Alexander J. Somogyi, Basking Ridge, NJ (US)

(73) Assignee: BEA Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/673,727

(22) Filed: Feb. 12, 2007

(65) Prior Publication Data

US 2007/0136393 A1    Jun. 14, 2007

Related U.S. Application Data

(63) Continuation of application No. 10/341,041, filed on Jan. 13, 2003, now Pat. No. 7,178,050.

(60) Provisional application No. 60/359,226, filed on Feb. 22, 2002.

(51) Int. Cl.
*G06F 11/00*    (2006.01)

(52) U.S. Cl. .............................. 714/4; 714/15; 707/202

(58) Field of Classification Search .................... None
See application file for complete search history.

(56) References Cited

U.S. PATENT DOCUMENTS

| | | |
|---|---|---|
| 4,714,996 A | 12/1987 | Gladney et al. |
| 5,163,148 A | 11/1992 | Walls |
| 5,500,940 A | 3/1996 | Skeie |
| 5,612,865 A | 3/1997 | Dasgupta |
| 5,613,060 A | 3/1997 | Britton et al. |
| 5,625,789 A | 4/1997 | Hesson et al. |
| 5,634,052 A | 5/1997 | Morris |
| 5,765,171 A | 6/1998 | Gehani et al. |
| 5,805,798 A | 9/1998 | Kearns et al. |
| 5,813,017 A | 9/1998 | Morris |

(Continued)

OTHER PUBLICATIONS

A. Bainbridge, et al., "CICS and Enterprise JavaBeans" IBM Systems Journal, vol. 40, No. 1; IBM; 2001; pp. 1-19.

(Continued)

*Primary Examiner*—Yolanda L Wilson
(74) *Attorney, Agent, or Firm*—Fliesler Meyer LLP

(57) ABSTRACT

A highly available transaction recovery service migration system in accordance with one embodiment of the present invention implements a server's Transaction Recovery Service (TRS) as a migratable service. In one embodiment of the present invention, the TRS is a server instance or software module implemented in JAVA. The TRS migrates to an available server that resides in the same cluster as the failed server. The migrated TRS obtains the TLOG of the failed server, reads the transaction log, and performs transaction recovery on behalf of the failed server. The migration may occur manually or automatically on a migratable services framework. The TRS of the failed server migrates back in a fail back operation once the failed primary server is restarted. Failback operation may occur whether recovery is completed or not. This expedites recovery and improves availability of the failed server thereby preserving the efficiency of the network and other servers.

12 Claims, 9 Drawing Sheets

U.S. PATENT DOCUMENTS

| | | | |
|---|---|---|---|
| 5,819,028 A | 10/1998 | Manghirmalani et al. | |
| 5,909,689 A | 6/1999 | Van Ryzin | |
| 5,991,804 A | 11/1999 | Bolosky et al. | |
| 6,065,046 A | 5/2000 | Feinberg et al. | |
| 6,122,629 A | 9/2000 | Walker et al. | |
| 6,173,293 B1 | 1/2001 | Thekkath et al. | |
| 6,212,521 B1 | 4/2001 | Minami et al. | |
| 6,256,634 B1 | 7/2001 | Moshaiov et al. | |
| 6,304,879 B1 | 10/2001 | Sobeski et al. | |
| 6,361,409 B1 | 3/2002 | Vishwanathan et al. | |
| 6,366,930 B1 | 4/2002 | Parker et al. | |
| 6,389,462 B1 | 5/2002 | Cohen et al. | |
| 6,393,459 B1 | 5/2002 | Lurndal | |
| 6,401,239 B1 | 6/2002 | Miron | |
| 6,425,005 B1 | 7/2002 | Dugan et al. | |
| 6,430,564 B1 | 8/2002 | Judge et al. | |
| 6,453,321 B1 | 9/2002 | Hill et al. | |
| 6,484,204 B1 | 11/2002 | Rabinovich | |
| 6,490,610 B1 | 12/2002 | Rizvi et al. | |
| 6,505,200 B1 | 1/2003 | Ims et al. | |
| 6,505,241 B2 | 1/2003 | Pitts | |
| 6,526,521 B1 | 2/2003 | Lim | |
| 6,539,381 B1 | 3/2003 | Prasad et al. | |
| 6,578,160 B1 * | 6/2003 | MacHardy et al. | 714/43 |
| 6,609,213 B1 | 8/2003 | Nguyen et al. | |
| 6,651,140 B1 | 11/2003 | Kumar | |
| 6,681,342 B2 | 1/2004 | Johnson et al. | |
| 6,721,777 B1 | 4/2004 | Sharma | |
| 6,738,811 B1 | 5/2004 | Liang | |
| 6,757,708 B1 | 6/2004 | Craig et al. | |
| 6,775,703 B1 | 8/2004 | Burns et al. | |
| 6,779,017 B1 | 8/2004 | Lamberton et al. | |
| 6,785,840 B1 | 8/2004 | Smith et al. | |
| 6,826,601 B2 | 11/2004 | Jacobs et al. | |
| 6,832,238 B1 | 12/2004 | Sharma et al. | |
| 6,836,889 B1 | 12/2004 | Chan et al. | |
| 6,898,587 B2 | 5/2005 | Messinger | |
| 6,918,013 B2 | 7/2005 | Jacobs et al. | |
| 6,963,857 B1 | 11/2005 | Johnson | |
| 7,000,019 B2 | 2/2006 | Low et al. | |
| 7,028,030 B2 | 4/2006 | Jacobs et al. | |
| 7,065,616 B2 | 6/2006 | Gajjar et al. | |
| 7,085,834 B2 | 8/2006 | Delany et al. | |
| 7,089,584 B1 | 8/2006 | Sharma | |
| 7,100,195 B1 | 8/2006 | Underwood | |
| 7,107,543 B2 | 9/2006 | Berry et al. | |
| 7,127,713 B2 | 10/2006 | Davis et al. | |
| 7,171,692 B1 | 1/2007 | DeMello et al. | |
| 7,240,101 B2 | 7/2007 | Rich et al. | |
| 7,254,634 B1 | 8/2007 | Davis et al. | |
| 2001/0042073 A1 | 11/2001 | Saether et al. | |
| 2001/0054062 A1 | 12/2001 | Ismael et al. | |
| 2002/0004850 A1 | 1/2002 | Sudarshan et al. | |
| 2002/0073188 A1 | 6/2002 | Rawson, III | |
| 2002/0107934 A1 | 8/2002 | Lowery et al. | |
| 2002/0116474 A1 | 8/2002 | Copeland et al. | |
| 2002/0147961 A1 | 10/2002 | Charters et al. | |
| 2002/0161839 A1 | 10/2002 | Colasurdo et al. | |
| 2002/0184444 A1 | 12/2002 | Shandony | |
| 2002/0188591 A1 | 12/2002 | Santosuosso | |
| 2003/0014480 A1 | 1/2003 | Pullara et al. | |
| 2003/0018732 A1 | 1/2003 | Jacobs et al. | |
| 2003/0037289 A1 | 2/2003 | Singh et al. | |
| 2003/0041135 A1 | 2/2003 | Keyes et al. | |
| 2003/0046442 A1 | 3/2003 | Maryka et al. | |
| 2003/0060214 A1 | 3/2003 | Hendrey et al. | |
| 2003/0065826 A1 | 4/2003 | Skufca et al. | |
| 2003/0074580 A1 | 4/2003 | Knouse et al. | |
| 2003/0088713 A1 | 5/2003 | Mandal et al. | |
| 2003/0105837 A1 | 6/2003 | Kamen et al. | |
| 2003/0110467 A1 | 6/2003 | Balakrishnan | |
| 2003/0115366 A1 | 6/2003 | Robinson | |
| 2003/0233433 A1 | 12/2003 | Halpern | |
| 2003/0236923 A1 | 12/2003 | Jeyaraman et al. | |
| 2004/0139125 A1 | 7/2004 | Strassburg et al. | |
| 2004/0230747 A1 | 11/2004 | Ims et al. | |
| 2006/0143239 A1 | 6/2006 | Battat et al. | |
| 2006/0168118 A1 | 7/2006 | Godlin et al. | |
| 2006/0212453 A1 | 9/2006 | Eshel et al. | |

OTHER PUBLICATIONS

M. H. Guiagoussou, et al., "A Java API for Advanced Faults Management"; 2001 IEEE; pp. 483-498.

Alex Louwe Kooijmans, et al., "Enterprise JavaBeans for z/OS and OS/390 WebSphere Application Server V4.0"; IBM Redbooks; First Edition, Dec. 2001; Table of Contents pp. v-xi, pp. 31-240.

"Java Management Extensions (JMX)"; © Sun Microsystems; 1999; 2 pages.

Stearns, "Using the J2EE Connector Architecture Common Client Interface", Sun MicroSystems Inc. , Apr. 2001, pp. 1-10.

Marinescu, "BEA Weblogic Server 6.1 has been released", TheServerSide.com, Jul. 31, 2001, p. 1.

Flowers, "The J2EE Connector Architecture", Sys-Con Media, May 1, 2001, pp. 1-4.

Rana, et al., "Java Junction", Intelligent Enterprise, Apr. 16, 2001, pp. 1-9.

Stanhope, "J2EE Connector Architecture Promises to Simplify Connection to Back-End Systems", Giga Information Group, Nov. 16, 2000, pp. 1-4.

Sarathy, et al., "Integrating Java Applications with the Enterprise", EAI Journal, May 2001, pp. 50-54.

BEA Systems, Inc., WebLogic Server 6.1, Sep. 19, 2001, 36 pages.

Rodoni, "The J2EE Connector Architecture's Resources Adapter", Sun MicroSystems Inc., Dec. 2001, pp. 1-12.

BEA Systems, Inc., WebLogic Server 6.1, Sep. 15, 2001, pp. 1-26.

Visveswaran, "Dive Into Connection Pooling with J2EE", Sun MicroSystems Inc., Oct. 2000, pp. 1-7.

Sun Microsystems, "Enterprise JavaBeans Specification, Version 2.0", 2 pages, Aug. 14, 2001.

Gamma, et al., "Design Patterns Elements of Reusable Object-Oriented Software", Addison-Wesley Publishing Company, 1995, pp. 293-303.

BEA Systems, "Connection Management", WebLogic Server 6.1, 2001, 3 pages.

* cited by examiner

SYSTEM FOR HIGHLY AVAILABLE TRANSACTION RECOVERY FOR TRANSACTION PROCESSING SYSTEMS

CLAIM TO PRIORITY

This application is a continuation of U.S. Application entitled SYSTEM FOR HIGHLY AVAILABLE TRANSACTION RECOVERY FOR TRANSACTION PROCESSING SYSTEMS, U.S. application Ser. No. 10/341,041 now U.S. Pat. No. 7,178,050, filed on Jan. 13, 2003 and U.S. Provisional Patent Application entitled "HIGHLY AVAILABLE TRANSACTION RECOVERY FOR TRANSACTION PROCESSING SYSTEMS", U.S. patent application No. 60/359,226, filed on Feb. 22, 2002 which are incorporated herein by reference.

CROSS REFERENCE TO RELATED APPLICATIONS

The present application is related to the following United States Patents and Patent Applications, which patents/applications are assigned to the owner of the present invention, and which patents/applications are incorporated by reference herein in their entirety:

U.S. patent application Ser. No. 10/366,075, entitled "SYSTEMS AND METHODS FOR MIGRATABLE SERVICES", filed on Feb. 13, 2003, currently pending.

U.S. application Ser. No. 10/341,207 now U.S. Pat. No. 7,152,181, entitled "METHOD FOR HIGHLY AVAILABLE TRANSACTION RECOVERY FOR TRANSACTION PROCESSING SYSTEMS", filed on Jan. 13, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Distributed networks are well known to programmers and computer system architects. A distributed network may include multiple nodes, computers, or servers. As used herein, a server is defined as a software process. A node or cluster is a group of servers that may exist on a single hardware machine or share a physical resource such as a memory disk. Each server in a network usually has applications or objects that perform different functions. An application on a particular server may be initiated by another server or by the server it resides on. Distributed networks are advantageous in that several applications required to accomplish a task or a process may be distributed among several servers. The distributed applications may then be called upon when needed. Processes invoked simultaneously may be run on different servers instead of weighing down a single server and processor. This advantageously distributes processing power and contributes to a more efficient network.

Distributed transactions can span multiple servers, and servers often host resource managers (e.g. database connection pools or JMS queues) which participate in distributed transactions. As a result of distributed transaction participation, locks or other internal resources can be held up in the resource managers (e.g. databases locks are acquired for database records that are updated in a distributed transaction) on behalf of the distributed transaction until the distributed transaction is completed. For each distributed transaction, a particular server acts as the coordinator, which drives the participating transactional resources to commit atomically, and thus the transaction to completion, via the Two Phase Commit (2PC) protocol. In the first phase of the 2PC protocol, the coordinator logs a record of the transaction and its participants persistently in its TLOG files after all participants are prepared successfully. Once prepared, all participants hold on to the acquired locks or other internal resources for the transaction until it is told to commit or rollback by the coordinator. In the second phase of the 2PC protocol, the coordinator commits all the participants, which then make the updates durable and release the locks and other internal resources. After all participants are successfully committed, the coordinator then releases the log record from its TLOG. Thus, if a coordinator fails, all the in-flight transactions that are logged in its TLOG files cannot be driven to completion, and thus all participants cannot release their locks or other internal resources, until the coordinator is restarted. Thus, with systems of the prior art, transaction recovery cannot take place before a failed server restarts. This limits the availability of transaction recovery of the failed server and thus the availability of other XA resources (e.g. JMS backends).

In addition to unexpected server failure, a server may be brought down intentionally. Application servers are often configured to run on specific machines to service client requests. These machines are brought down for periodic maintenance, machine servicing, and other reasons. As a result, the servers located on the downed machine are not able to service client requests to that machine or perform recovery of in-doubt transactions until the servers are restarted.

One approach the prior art has taken to address this problem is to migrate servers and their TLOG files to a back-up or alternate machine. This allows unfinished transactions in a TLOG to be processed thus improving the availability of the failed server and preserving the operation and efficiency of a network. One such server migration system for use in a distributed network is included in the BEA TUXEDO application. TUXEDO supports migration of multiple servers residing on a machine. The servers must either consist of a group of servers or all the servers that reside on a machine. A group of servers within the TUXEDO application is defined as a collection of servers or services on a machine, often associated with a resource manager.

An administrator manually migrates servers using the TUXEDO application. The administrator specifies a primary machine and a secondary or back-up machine for each group of servers. Once a server group has failed or been deactivated by a user, a user may manually migrate the servers from the primary machine to the secondary machine. The primary then becomes the acting secondary machine, and the secondary becomes the acting primary machine. When the group of servers is to be moved back to the original primary machine, the user shuts-down the back-up machine and then migrates the server group back to the original primary machine.

Though a TLOG cannot be migrated by itself in Tuxedo, an administrator may manually migrate a TLOG file to a back-up server as a secondary step to of migrating a server. The TLOG migration is a manual process performed with tmadmin commands. To migrate a TLOG in TUXEDO, an Atmadmin@ session is started and all servers that write to the TLOG are manually shut-down by a user. Next, the user dumps the TLOG contents into a text file, copies the name of the TLOG file to the back-up machine, and reads the text file into the existing TLOG for the specified back-up machine. The user then forces a warm start of the TLOG. Though a user may manually migrate a TLOG in this manner, TUXEDO does not support having multiple TLOGs per server.

There are several disadvantages to the prior art such as the TUXEDO application. Tuxedo does not support the migration of anything less than a group of servers. Thus, if a single server has crashed in a system or requires maintenance, multiple servers must be shut-down in order to migrate the server. Tuxedo requires that all servers that write to a particular TLOG file must be shut-down while the TLOG file is migrated. Tuxedo also does not support multiple TLOGs residing on a single server. In Tuxedo, there is only one TLOG for a group of servers. Once servers of a machine or group have migrated, and the corresponding TLOG is migrated thereafter, the secondary machine hosts only the migrated TLOG. Additionally, all migration steps in Tuxedo are done manually, including a complete shut-down of the secondary server when failing back to the original primary or master server. What is needed is a migration system that addresses the deficiencies of existing migration systems such as the one in Tuxedo.

SUMMARY OF THE INVENTION

A highly available transaction recovery service migration system in accordance with one embodiment of the present invention implements a server's Transaction Recovery Service as a migratable service. In one embodiment of the present invention, the TRS is a server instance or software module implemented in JAVA. Highly available transaction recovery of a server within a cluster is achieved by migrating the TRS to another available server in the same cluster. This allows the backup server to read the transaction log and perform recovery on the behalf of the failed server. Each server in a cluster has a corresponding TRS, which maintains ownership of the servers's TLOG. When a primary server fails, the failed servers's TRS migrates to an available secondary server that resides in the same cluster as the failed server. The primary server and secondary server share access to the same memory disk. While residing on the secondary server, the migrated TRS obtains access to the TLOG of the failed primary server, reads the transaction log, and performs transaction recovery on behalf of the failed server. Multiple TRS instances may reside on any server, all of which performing transaction recovery on a single server. The migration may occur manually or automatically on a migratable services framework. The TRS of the failed primary server migrates back to the primary server in a fail back operation once the failed primary server is restarted. Failback operation may occur whether recovery is completed or not. No servers need to be shutdown during TRS failover migration to a secondary server or during TRS failback migration to the primary server. This expedites recovery and improves availability of the failed server thereby preserving the efficiency of the network and other servers.

DETAILED DESCRIPTION

A highly available transaction recovery service migration system in accordance with one embodiment of the present invention implements a server's Transaction Recovery Service (TRS) as a migratable service. In one embodiment of the present invention, the TRS is a server instance implemented in JAVA. The TRS migrates to an available server that resides in the same cluster as the failed server. Highly available transaction recovery of a server within a cluster is achieved by migrating the TRS to another available server in the same cluster. The migrated TRS obtains the TLOG of the failed server, reads the transaction log, and performs transaction recovery on behalf of the failed server. A server may host multiple TRS instances at any time as well as coordinate their corresponding TLOG transactions. In one embodiment of the present invention, though a server may host multiple TRS instances and TLOGS, each TRS and TLOG corresponds to only one server. The migration may occur manually or automatically on a migratable services framework. The TRS of the failed server migrates back in a fail back operation once the failed primary server is restarted. Failback operation may occur whether recovery is completed or not. No servers need to be shutdown during TRS failover migration to a secondary server or during TRS failback migration to the primary server. This expedites recovery of the failed server and while preserving the efficiency of the network and other servers.

Figure 1A:
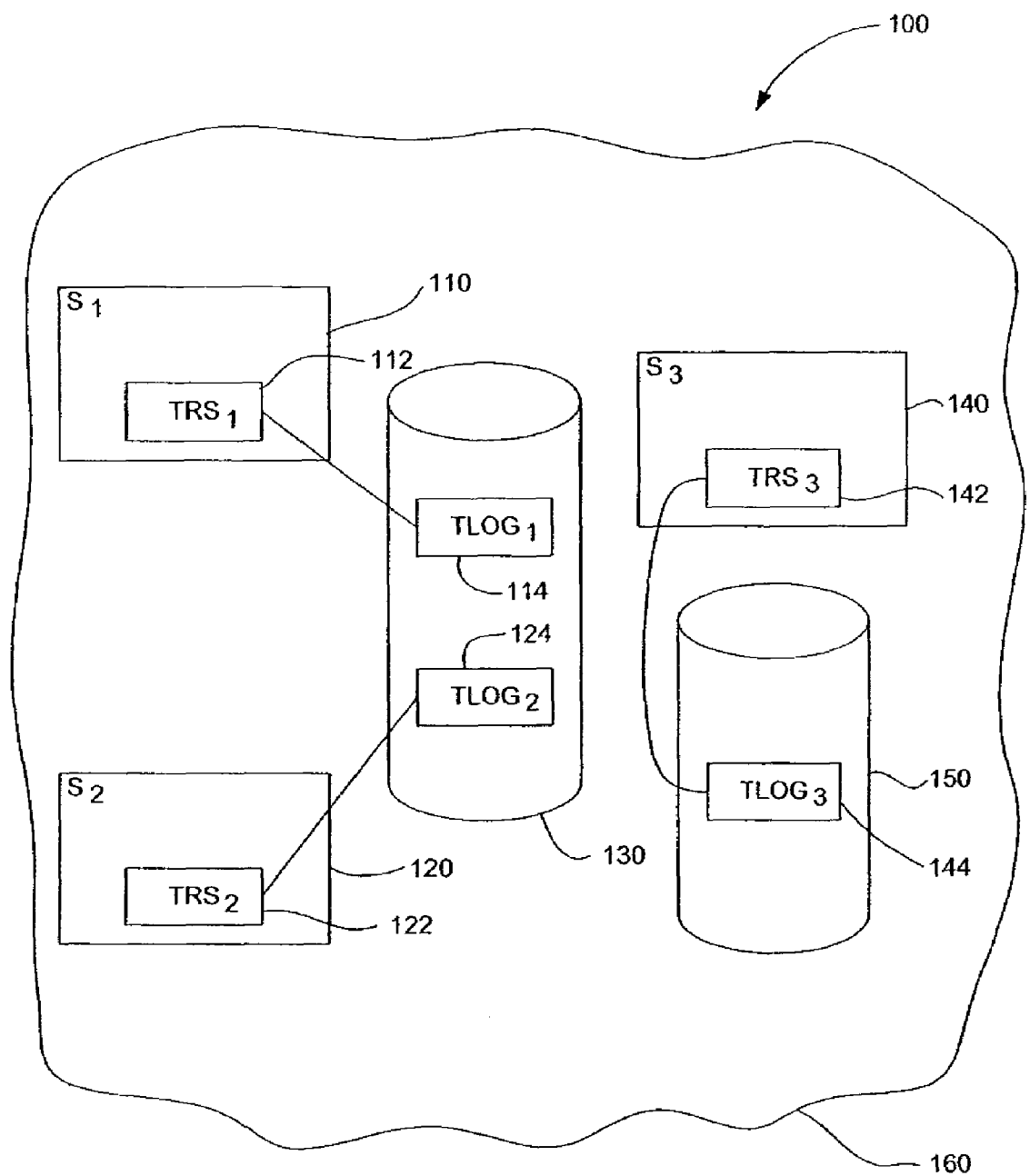
FIG. 1a is a block diagram of a transaction recovery service migration system in accordance with one embodiment of the present invention.

A transaction recovery service migration system 100 in accordance with one embodiment of the present invention is shown in FIG. 1a. System 100 includes servers 110, 120 and 140. Each server has a corresponding TRS instance 112, 122, and 142, respectively. Servers 110 and 120 share a common disk 130 while server 140 utilizes a separate disk 150. Each server has a corresponding transaction log (TLOG) that resides on a disk. Server 110 has TLOG 114 on disk 130, server 120 has TLOG 124 on disk 130, and server 140 has TLOG 144 on disk 150. All servers may reside on a single cluster 160. Servers within a cluster may reside on the same or different machines (not shown).

In one embodiment of the present invention, each server is associated with only one TLOG. Each TRS has exclusive ownership of the TLOG for it's particular server. Thus, TRS 122 has exclusive ownership of the TLOG for server 120, TLOG 130. When a particular server fails, the TRS for the failed server may be migrated to an alternate server. The migrated TRS may then perform recovery on the failed server's TLOG while residing on the alternate server. In one embodiment of the present invention, a TRS may only be migrated to a server that has access to the same disk space as the failed server. In particular, the shared disk space must contain TLOG files for the failed server. In another embodiment, an administrator may transfer the TLOG file for the failed server to the disk that the alternate server can access. The shared disk space may be a dual-ported SCSI, a storage area network (SAN), or some other reliable shared disk architecture.

Figure 1B:
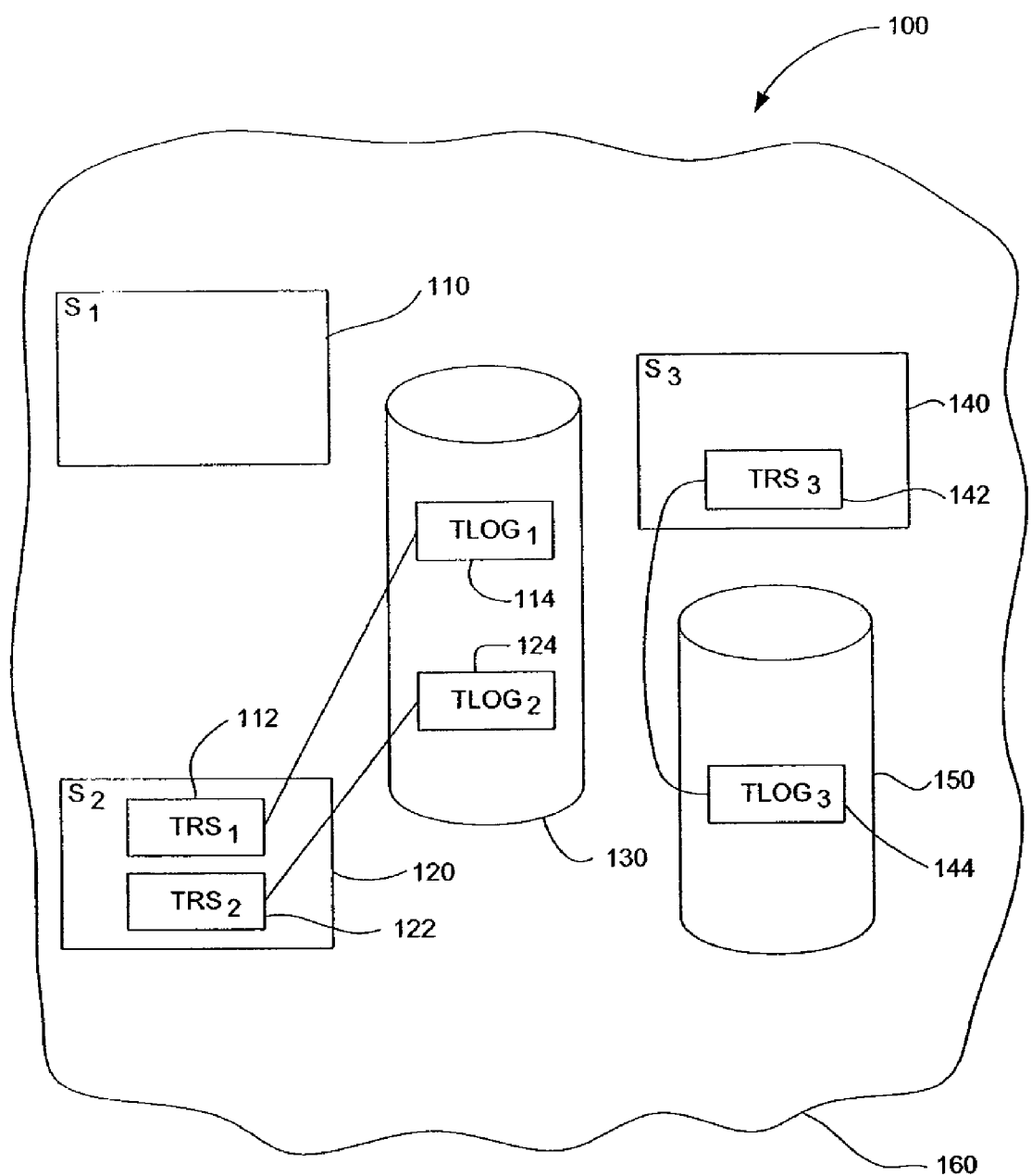
FIG. 1b is a block diagram of a transaction recovery service migration system after failover in accordance with one embodiment of the present invention.

For example, if server 110 fails, the TRS 112 can migrate to server 120 as shown in FIG. 1b. Once at server 120, TRS1 112 performs recovery on TLOG 114 corresponding to server 110. In this case, server 110 is the primary server and server 120 is the back-up, secondary, or alternate server. A migration of a TRS from a primary server to a secondary server is called failover. In one embodiment of the present invention, a TRS may undergo failover migration to a server that shares access to the memory containing the TLOG of the failed server. In FIG. 1b, TRS 112 could not perform recovery on server 110 if migrated to server 140 because server 140 and server 110 do not share access to memory 130. If TRS 112 migrates to server 140, recovery by TRS 112 would require that server 140 obtain access to memory disk 130 or experience another migration to a server with access to disk 130.

Each TRS is also associated with a migratable target as an alternate server. In one embodiment, administrators can configure a JTAMigratableTarget element for a clustered server. One example of a JTAMigratableTarget configuration is as follows:

This method returns whether the Transaction Recovery Service is currently activated on the server. Another method is:

int getInitialRecoveredTransactionTotalCount( ).

This method returns the total number of transactions that are read from the transaction log by the TRS. The administrator may use this information to increase the value of the MaxTransactions attribute of the JTAMBean MBean as appropriate. Another method is:

int getRecoveredTransactionCompletionPercent( ).

This method returns the percentage of the recovered transactions that are completed by the Transaction Recovery Service. In one embodiment, the name of the JTARecoveryRuntimeMBean MBean is the name of the original server of the Transaction Recovery Service.

Though failover and failback migration usually involve moving a single TRS instance at any time, a server may facilitate multiple TRS instances residing on the server and coordinate multiple transactions for TLOGs corresponding to the multiple TRS instances. In this case, the server performs recovery for multiple TRS instances in parallel. Server 120 in FIG. 1b facilitates recovery for failed server 110 as well as its own recovery and normal processing. In one embodiment, only the primary server may service new transactions. In this embodiment, a back-up server can not service new transactions for a failed primary server. To regain its TRS and service new transactions, the failed primary server must restart and the TRS must migrate back to the primary server. Migration of a TRS from a secondary server back to a primary server is called failback. Failback operation may vary according to whether recovery for the failed server is completed or not before failback occurs. After failback, TRS 112 would again reside in server 110 as shown in FIG. 1a.

In one embodiment of the present invention, manual migration failover is the only migration scenario that

```
<Server    Name="server1"    Cluster="mycluster"    ListenAddress="campton-
                                                    1"
ListenPort="7001">       <JTAMigratableTarget       Name="server1"
ConstraintedCandidateServers="server1,server2"
/></Server>
```

The runtime information is available from a JTA runtime MBean: JTARecoveryRuntimeMBean, which can be obtained from a JTARuntimeMBean MBean. In one embodiment, at least two methods of the JTARuntimeMBean MBean may provide access to the JTARecoveryRuntimeMBean. One method is:

JTARecoveryRuntimeMBean[ ] getRecoveryRuntimeMBeans( ).

This method returns an array of JTARecoveryRuntimeMBean MBeans that corresponds to the TRS instances that are deployed on the current server. Another method is:

JTARecoveryRuntimeMBean getRecoveryRuntimeMBean(String serverName).

Figure 2:
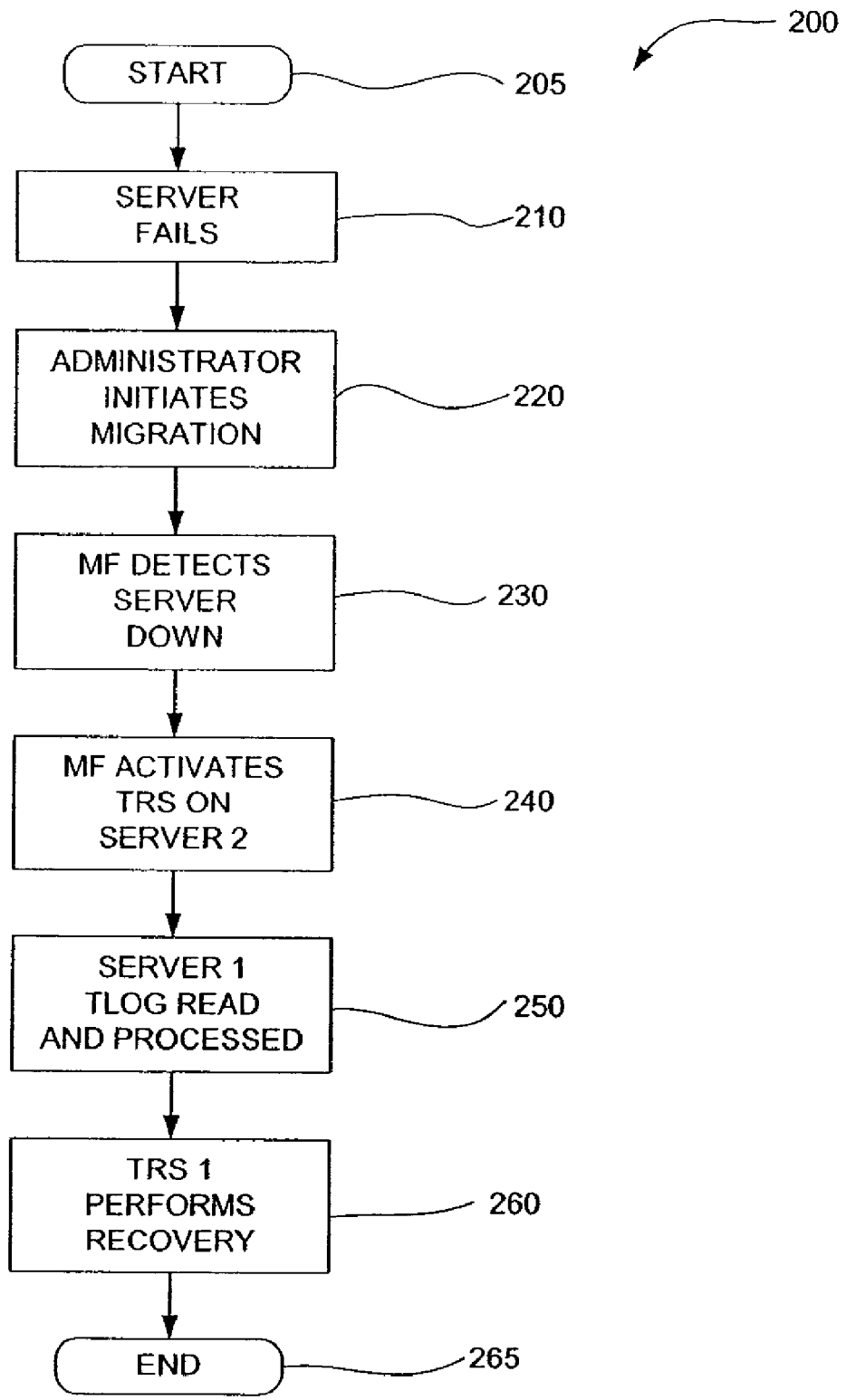
FIG. 2 is a diagram of a flow chart showing manual migration failover operation in accordance with one embodiment of the present invention.
Figure 3:
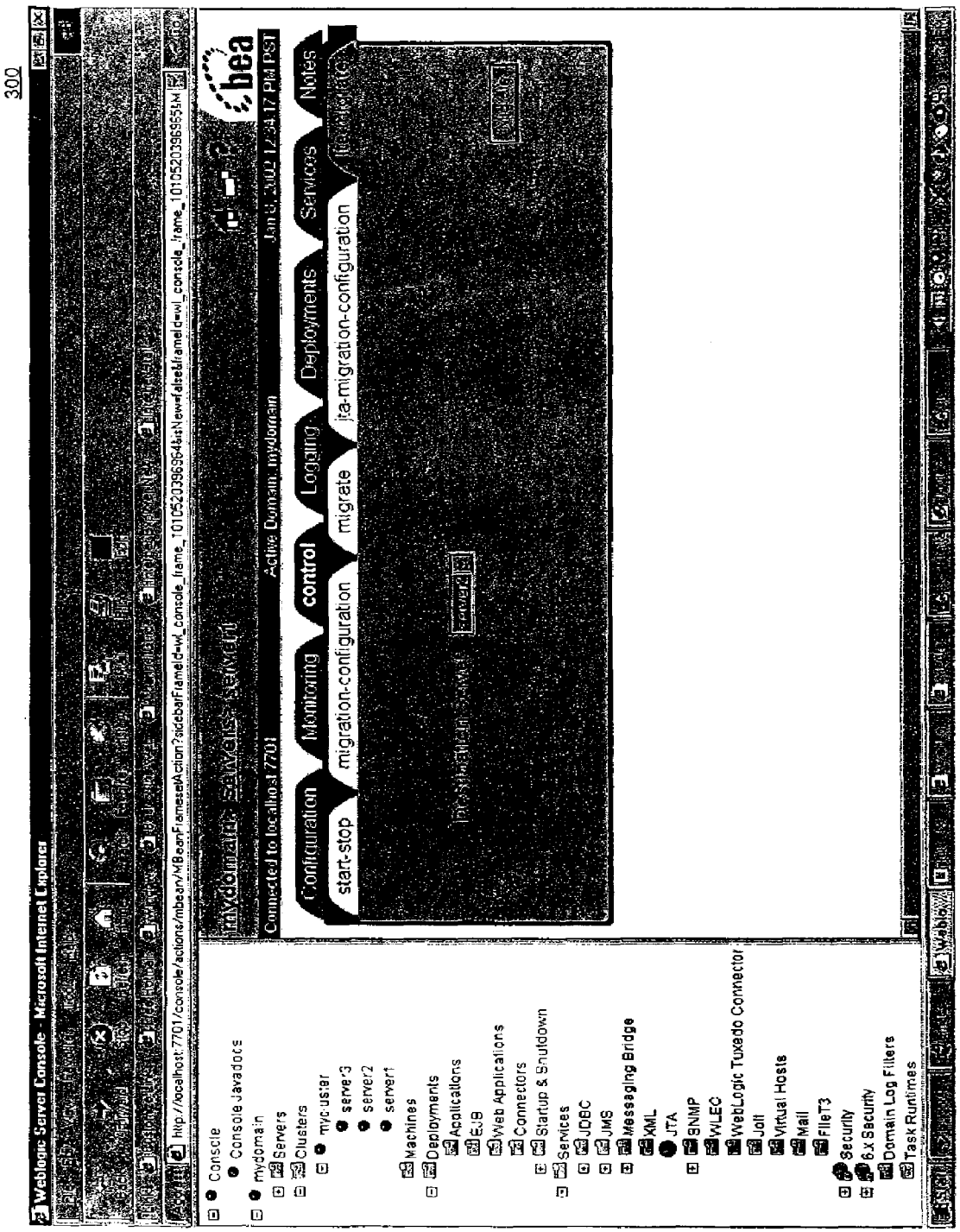
FIG. 3 is an illustration of a GUI for implementing the present invention in accordance with one embodiment of the present invention.

This method returns the JTARecoveryRuntimeMBean MBean that is associated with the specified server. If the corresponding JTARecoveryRuntimeMBean MBean is not deployed on this server, null is returned. The JTARecoveryRuntimeMBean MBean has several methods as well. One method is:

boolean isActive( )

requires interaction by a user. An administrator may manually migrate the TRS of a failed server to another available server in the same cluster. The operation of a manual migration failover system in accordance with one embodiment of the present invention is shown in block diagram 200 of FIG. 2. Manual migration failover operation begins at start step 205. A first server instance (S1) fails in step 210. This may occur by an act of an administrator or by server malfunction. In step 220, a user issues a migrate command to trigger the migration of the transaction recovery service for the first server instance (TRS1) from S1 to a second server instance (S2). This is usually done after the user has discovered a failed server or has shut-down a server. In one embodiment, a user my trigger the migration of TRS1 from S1 to S2 using a console implemented as a GUI system. The GUI console may be implemented so as to graphically display different clusters and servers. The user may choose a server having the corresponding TRS to migrate and the back-up server to receive the TRS. In one embodiment, the migration would be performed using a Java Transaction API (JTA). A JTA Recovery tab is provided for each server that allows administrators to specify various attributes of a Migratable Target and perform manual migration of the Transaction Recovery Service associated with the server. The appearance as viewed on a computer screen of a GUI allowing a user to issue a migrate command in accordance with one embodiment of the present invention is shown in FIG. 3. In another embodiment of the present invention, a user or system administrator may trigger a manual migration of a TRS using a command line. A command line administration tool, implemented as a Java program, may allow a user to specify the TRS to be migrated and what server to migrate the TRS to. The command line tool may also require a user to enter a username and password in order to perform the migration. The general format of such a command line command in accordance with one embodiment of the present invention is shown below.

java weblogic.Admin [-url <url>] [-username <username>] [-password <password>] MIGRATE-jta-migratabletarget <server name>-destination <destination servername>
[-sourcedown] [-destinationdown]

In another embodiment of the present invention, manual migration may be triggered by a user programmatically using a JMX MBean. In particular, a JMX MigratableTarget MBean of the TRS may be used to trigger the migration of a TRS from one server to another. An example of the code comprising a MigratableTarget MBean in accordance with one embodiment of the present invention is below.

framework system. After step 230, the migratable framework then activates TRS1 on S2 in step 240. In one embodiment, all migratable services including instance TRS1 must implement a particular interface. The interface must be registered with the migratable framework and includes migration activate and deactivate methods. In this embodiment, migration is activated when the migratable framework calls the migration activate method of TRS1 currently residing on S2. Then, TRS1 reads and processes the TLOG for S1 in step 250. TRS1 reads S1's TLOG files, instantiates the transactions of the TLOG files, puts them into the transaction map of S2, and schedules resource recovery for S1. As a result, S2 services will read and coordinate the transactions from S1's TLOG. The S2 server becomes the coordinator of previously in doubt transactions and talks to different coordinators and resource managers to resolve transactions. Next, TRS1 performs recovery on behalf of S1 in step 260 while still residing on S2. TRS1 performs recovery on behalf of S1 asynchronously. Meanwhile, the backup server's own transaction manager functions to accept new transactions and perform its own transaction recovery as usual. Thus, there may be more than one instance of TRS activated on a back-up server at any time, the multiple TRS instances originating from different servers. The recovery may include driving prepared transactions to completion and performing resource recovery. Manual migration failover is then complete and operation ends at step 265. Similar manual migration can be performed to migrate the TRS to another available backup server if a

```
import weblogic.management.Admin;
import weblogic.management.configuration.MigratableTargetMBean;
import weblogic.management.configuration.ServerMBean;
import weblogic.management.runtime.MigratableServiceCoordinatorRuntimeMBean;
// Obtain the MigratableServiceCoordinatorRuntimeMBean
MigratableServiceCoordinatorRuntimeMBean msc =
Admin.getAdminServer( ).getMigratableServiceCoordinatorRuntime( );
// Obtain the MigratableTargetMBean of the server whose Transaction
Recovery Service needs to be migrated
ServerMBean server1 = (ServerMBean)
Admin.getMBeanHome( ).getConfigurationMBean("server1",
"MigratableTargetConfig");
MigratableTargetMBean mt = server1.getJTAMigratableTarget( );
// Obtain the configuration ServerMBean of the server to which the
Transaction Recovery Service will be migrated
ServerMBean server2 = (ServerMBean)
Admin.getMBeanHome( ).getConfigurationMBean("server2",
"MigratableTargetConfig");
// Perform the migration of Transaction Recovery Service of "server 1" to
"server2"
msc.migrateJTA(mt, server2, false /*source up*/, false /*destination up*/);
```

Though specific code is listed above, an MBean can be configured and implemented in various ways to achieve the result of triggering the migration of a TRS from one server to another. These variations of code are all considered within the scope of the present invention. The present invention is not intended to be limited to the JMX MigratableTarget MBean code example listed above.

Next, the migratable framework detects that the S1 is down in step 230. In one embodiment, the user issued command in step 220 informs the migratable framework that the server is down. When the migratable framework detects the server is down in step 220, the migratable framework moves the TRS to a back-up server. The back-up server may be specified by a user or be pre-determined by the migratable backup server fails before completing the transaction recovery actions for the original server.

Figure 4:
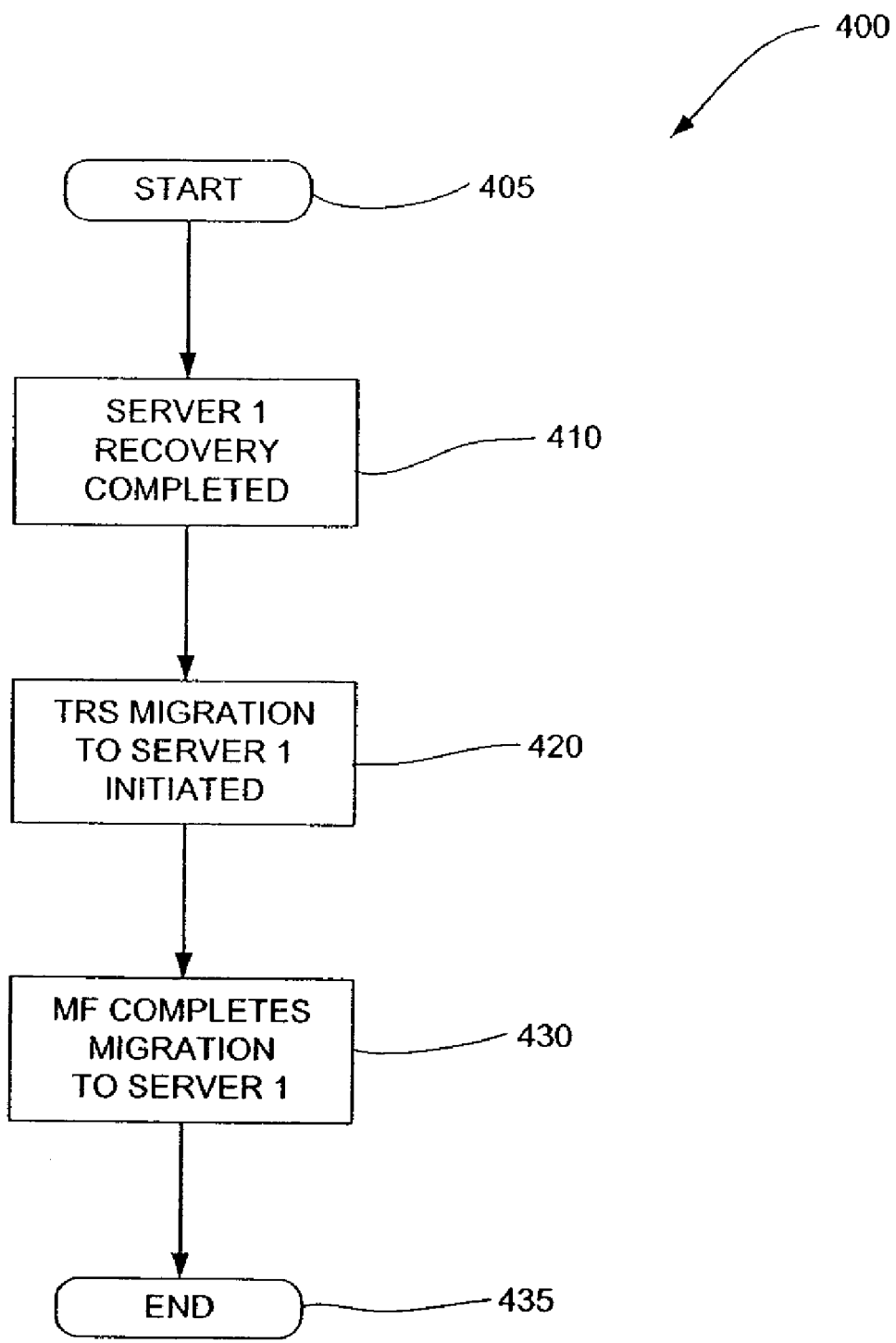
FIG. 4 is a diagram of a flow chart showing manual migration failback operation after recovery is complete in accordance with one embodiment of the present invention.

In one embodiment, failback occurs when a failed primary server restarts and is ready to receive its TRS instance back from a back-up server. The operation of a manual migration failback performed after recovery is completed in accordance with one embodiment of the present invention is shown in diagram 400 of FIG. 4. System operation begins with start step 405. In step 410, an alternate or back-up server S2 completes recovery for a primary server S1. In one embodiment, recovery completion occurs when TRS1 of S1 finishes recovery for S1 while residing on S2. Once TRS1 completes recovery, TRS1 relinquishes control of S1's TLOG files. Next, TRS1 migration back to S1 is initiated in step 420. In one embodiment, an administrator may manually initiate migration of the TRS back to the original server. In another embodiment, migration is initiated when TRS1 contacts the migratable framework and makes a request to migrate TRS1 back to S1. In step 430, the migratable framework completes the migration of TRS1 from S2 back to S1. In one embodiment, the migratable framework first deactivates TRS1 on S2 by calling a deactivation method of TRS1. During the deactivation of TRS1, S2 performs cleanup and removes any remaining transactions of S1 from its internal transaction map. After this deactivation of TRS1, the migratable framework moves TRS1 to S1. Then, the migratable framework activates TRS1 on S1 using a call to an activation method of TRS1. Operation then ends in step 435. When S1 later restarts, S1 will regain ownership of the TLOG corresponding to S1 and will not need to perform further recovery work.

Figure 5:
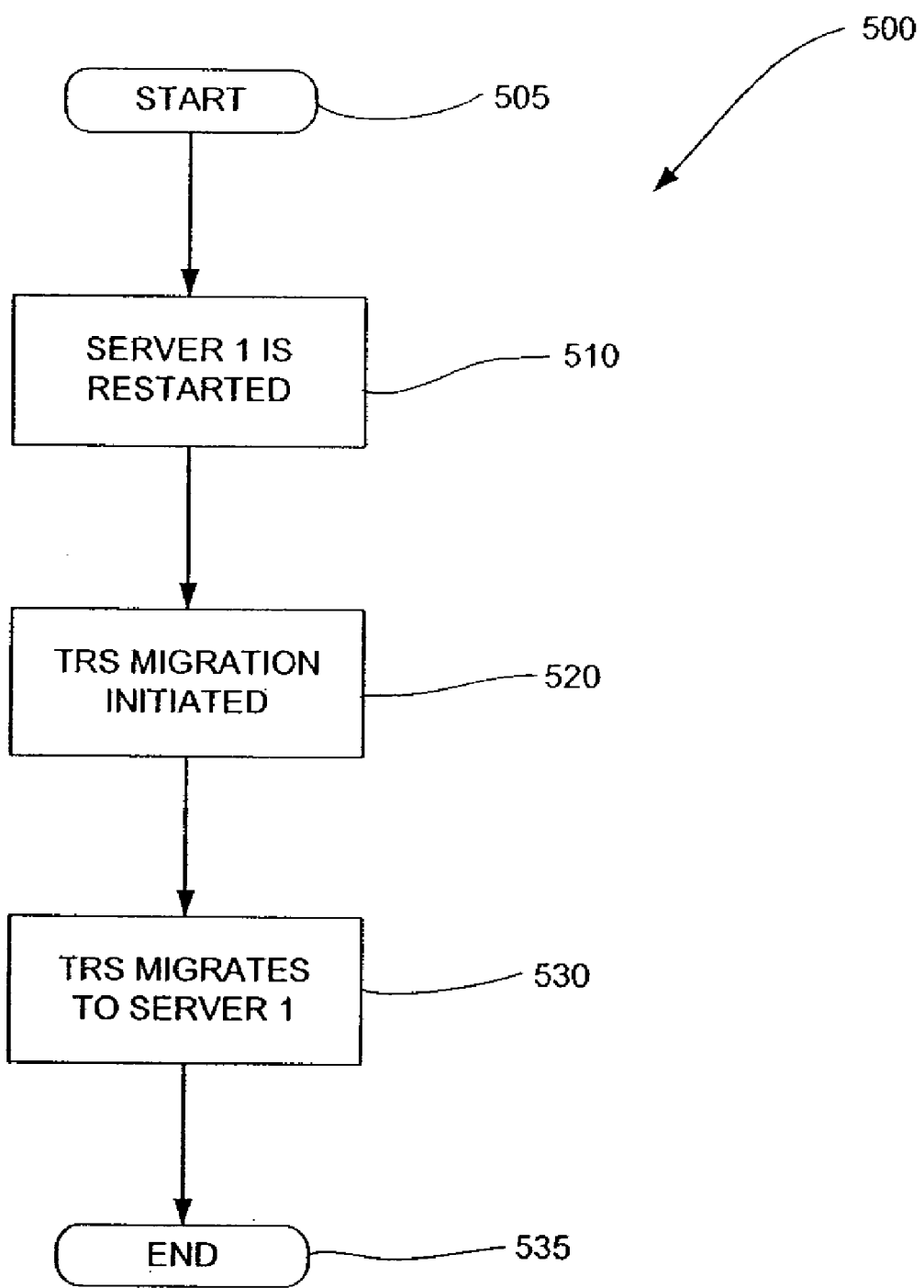
FIG. 5 is a diagram of a flow chart showing manual migration failback operation before recovery is complete in accordance with one embodiment of the present invention.

Manual migration failback may also be performed before recovery is complete. Operation of manual migration failback performed before recovery is completed in accordance with one embodiment of the present invention is shown in diagram 500 of FIG. 5. Operation begins at start step 505. In step 510, S1 is restarted. Up until just before S1 restart, S2 is still performing recovery work for S1. During S1 startup, S1 notifies S2 that S1 is now operational. In one embodiment, the notification is in the form of an administrative MBean event sent from S1 to S2. Next, TRS1 migration back to S1 is initiated in step 520. In one embodiment, TRS1 residing on S2 sends a request to the migratable framework to migrate TRS1 back to S1. Then, TRS1 migrates from S2 to S1 in step 530. In one embodiment, an administrator may manually migrate TRS1 back to S1 from S2. This may be performed when the back-up server fails to implicitly migrate TRS1 back to the original server S1. During this manual migration, the migratable service framework deactivates the TRS1 on S2. The deactivation of TRS1 suspends recovery for S1 and allows S2 to perform cleanup and remove any remaining transactions of S1 from its internal transaction map. In another embodiment, the migratable framework first deactivates TRS1 on S2 by calling a deactivation method of TRS1. The deactivation of TRS1 on S2 suspends recovery processing for S1. Thus, S2 may checkpoint the TLOG for S1, purge transactions in its transaction map originating from S1's TLOG, and stop resource recovery performed for S1. During the deactivation of TRS1, S2 performs cleanup and removes any remaining transactions of S1 from its internal transaction map. S2 then relinquishes control of S1's TLOG. After this deactivation of TRS1, the migratable framework moves TRS1 to S1. Then, the migratable framework activates TRS1 on S1. TRS1 is activated by issuing a call to an activation method of TRS1. Operation then ends in step 545. Though falling under the category of manual migration, no administrator intervention is required for manual migration failback before recovery is done. Once S1 regains ownership of TRS1, it restarts and completes the remaining transaction recovery work.

Figure 6:
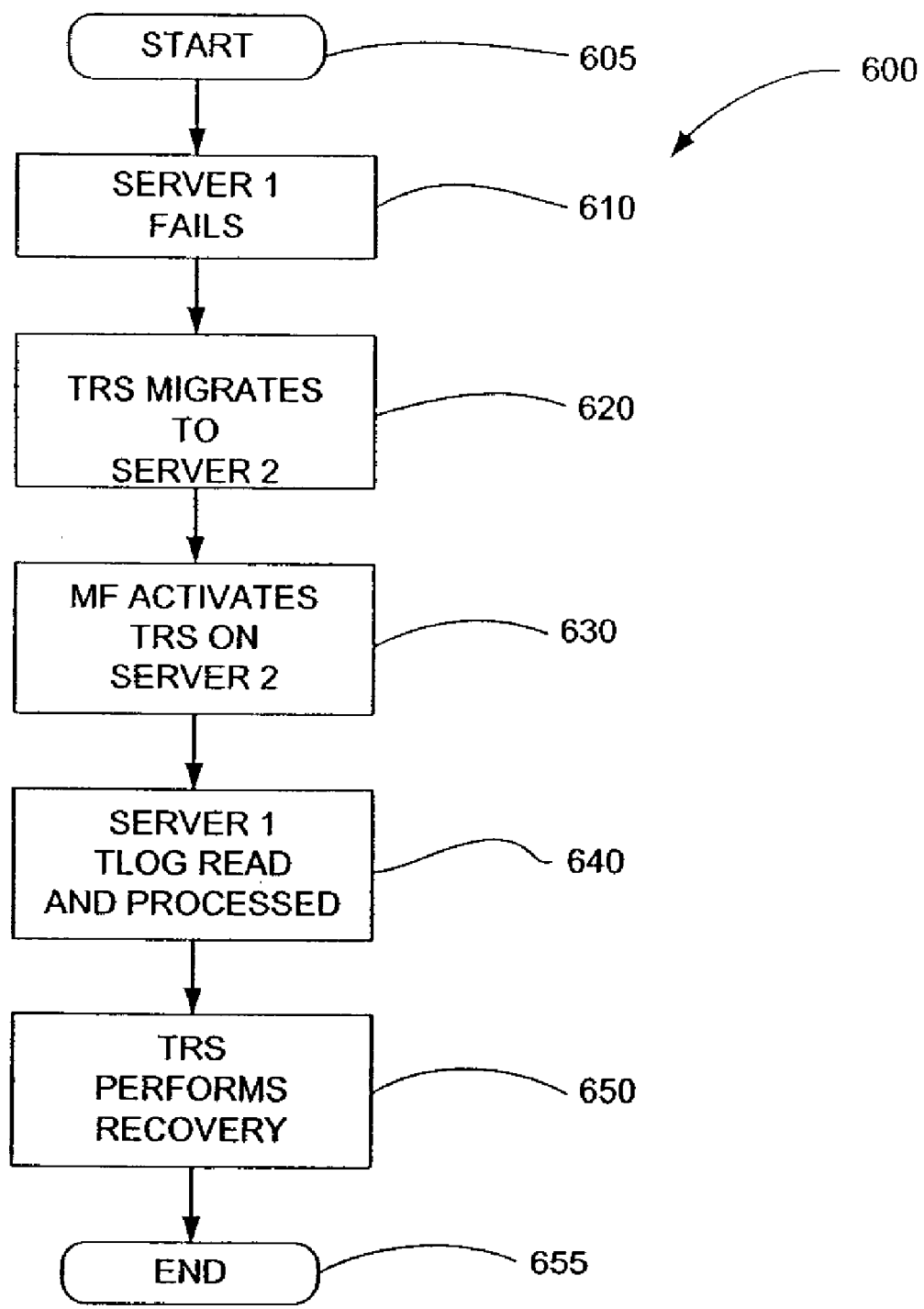
FIG. 6 is a diagram of a flow chart showing automatic migration failover operation in accordance with one embodiment of the present invention.

Automatic migration occurs without any administrative intervention required. Automatic failover and failback migration occur without any input from a user. In one embodiment, migration occurs seamlessly and without notification to the user. Operation of automatic migration failover in accordance with one embodiment of the present invention is shown in diagram 600 of FIG. 6. Operation begins at start step 605. Server failure of S1 occurs at step 610. Next, TRS1 is migrated to S2 in step 620. In one embodiment, TRS1 migration to S2 is triggered when the migratable framework detects the failure of S1. The migratable framework then migrates TRS1 from S1 to S2. In one embodiment, a user may specify a preferred order of back-up servers. A preferred server list as indicated by a user may be stored in the migratable target MBean. The migratable framework will then attempt to migrate TRS1 to the preferred back-up servers in the order specified by the user. Then, the migratable framework activates TRS1 on S2 in step 630. In one embodiment, TRS1 is activated when the migratable framework calls a migration activation method of TRS1. Next, S1's TLOG is read and processed in step 640. In one embodiment, during activation on S2, TRS1 reads S1's TLOG files regarding S1 transactions and configures S2 accordingly. In one embodiment, TRS1 instantiates the S1 TLOG files, places the files in S2's transaction map, and schedules resource recovery for S1. Thus, S2 is configured to be the coordinator of the transactions read from S1's TLOG. Next, TRS1 performs recovery on behalf of S1 in step 650. In one embodiment, recovery includes driving prepared transactions to completion and performing resource recovery. Automatic migration failover operation then ends in step 655. S2's own transaction manager and TRS2 function as usual during automatic migration failover. Similar manual migration can also be performed to migrate TRS1 to another available backup server if a backup server S2 fails before completing the transaction recovery actions for the original server S1.

Figure 7:
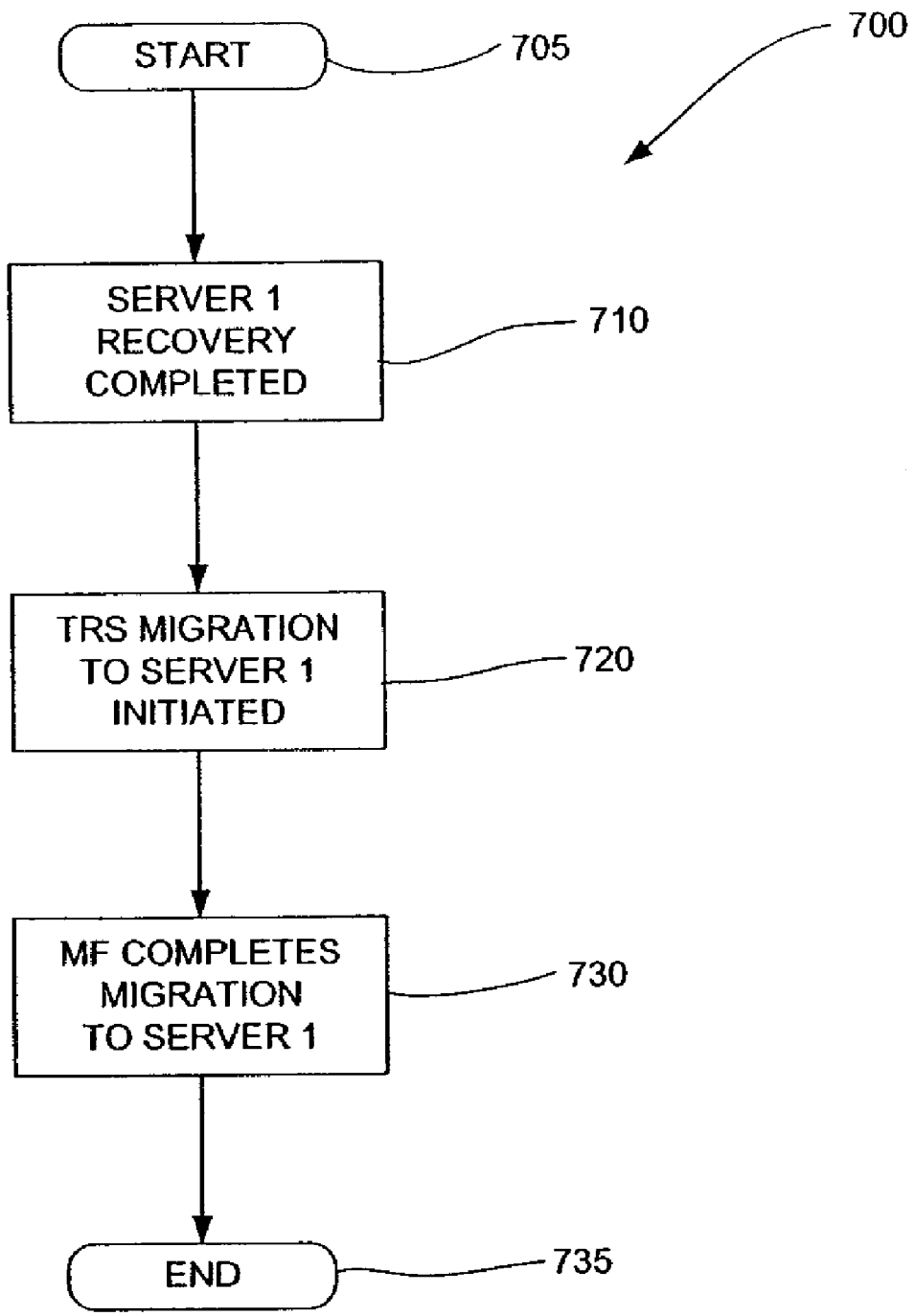
FIG. 7 is a diagram of a flow chart showing automatic migration failback operation after recovery is complete in accordance with one embodiment of the present invention.

Automatic migration failback is similar to automatic migration failover in that no administrative intervention is required. Operation of automatic migration failback after recovery is complete in accordance with one embodiment of the present invention is shown in diagram 700 of FIG. 7. Operation begins at start step 705. Next, S1 recovery is completed in step 710. In one embodiment of the present invention, recovery is completed when TRS1 finishes recovery for S1 while located on S2. The TRS1 checkpoints S1's TLOG files and relinquishes control of S1's TLOG files. Then, TRS1 migration back to S1 is initiated in step 720. In one embodiment of the present invention, the migration is initiated when TRS1 requests the migratable framework to migrate TRS1 back to S1. Next, the migratable framework completes migration of the TRS to S1 in step 730. The migratable framework first deactivates TRS1 on S2 by calling a deactivation method of TRS1. TRS1 deactivation results in S2 relinquishing control of S1's TLOG. During the deactivation of TRS1, S2 performs cleanup and removes any remaining transactions of S1 from its internal transaction map. After this deactivation of TRS1, the migratable framework moves TRS1 to S1. Then, the migratable framework activates TRS1 on S1. TRS1 is activated by issuing a call to an activation method of TRS1. Once migration is complete, operation ends in step 735. When S1 is restarted, S1 regains ownership of it's TLOG as a result of TRS1 resides on S1. S1 does not need to perform additional recovery work.

Figure 8:
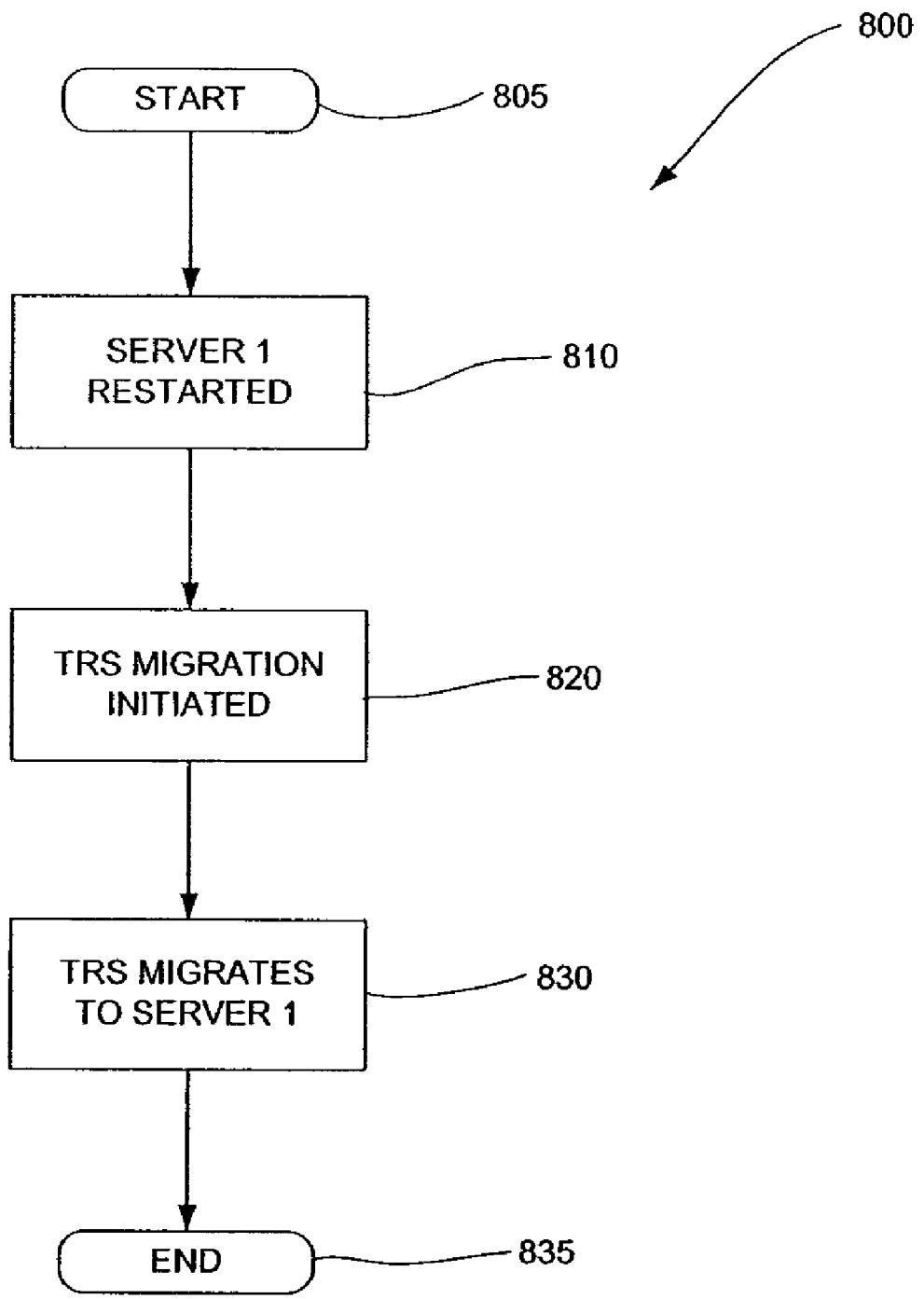
FIG. 8 is a diagram of a flow chart showing automatic migration failback operation before recovery is done in accordance with one embodiment of the present invention.

Automatic migration failback may also occur before recovery of the failed server is complete. Operation of automatic migration failback before recovery is complete in accordance with one embodiment of the present invention is shown in diagram 800 of FIG. 8. Operation begins with start step 805. Next, S1 is restarted in step 810. At the time of S1 restart, TRS1 residing on S2 has not completed performing recovery on behalf of S1. TRS1 migration is then initiated in step 820. In one embodiment, the migratable framework initiates migration upon detecting that S1 has performed startup. The migratable framework may detect the failure of the server itself or be notified of the server startup by an outside source. In one embodiment, S1 informs S2 that S1 has restarted. After migration has been initiated in step 820, the TRS1 migrates to S1 in step 830. In one embodiment, the migratable framework first deactivates TRS1 on S2 by calling a deactivation method of TRS1. The deactivation of TRS1 on S2 suspends recovery processing for S1 by TRS1 on S2. The deactivation includes checkpointing the TLOG for S1, purging transactions in its transaction map originating from S1's TLOG, and stopping resource recovery performed for S1. During the deactivation of TRS1, S2 performs cleanup and removes any remaining transactions of S1 from its internal transaction map. S2 then relinquishes control of S1's TLOG files as TRS1 migrates back to S1. After this deactivation of TRS1, the migratable framework moves TRS1 to S1. Then, the migratable framework activates TRS1 on S1. TRS1 is activated by issuing a call to an activation method of TRS1. Once migration is complete, operation ends in step 835. Once S1 regains ownership of TRS1 and restarts, S1 performs the remaining recovery work.

A highly available transaction recovery service migration system in accordance with one embodiment of the present invention implements a server' Transaction Recovery Service as a migratable service. In one embodiment of the present invention, the TRS is a server instance or software module implemented in JAVA. Each server in a cluster has a corresponding TRS, which maintains ownership of the servers' TLOG. When a primary server fails, the failed servers' TRS migrates to an available back-up server that resides in the same cluster as the failed server. The primary server and back-up server share access to the same memory disk. While residing on the back-up server, the migrated TRS obtains access to the TLOG of the failed server, reads the transaction log, and performs transaction recovery on behalf of the failed server. The migration may occur manually or automatically on a migratable services network. Automatic migration requires the TRS be deployed on the migratable service framework. The TRS of the failed server migrates back to the primary server in a fail back operation once the failed primary server is restarted. Failback operation may occur whether recovery is completed or not. This expedites recovery and improves the availability of the failed server thereby preserving the efficiency of the network and other servers.

Examples of embodiments within the scope and spirit of the present invention are included in the Appendix to this patent disclosure.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for implementing Node Managers.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

APPENDIX 1.1 Product Perspective

With systems of the prior art, transaction recovery cannot take place before a failed server restarts. This limits the availability of transaction recovery of the failed server and thus the availability of other XA resources (e.g. JMS backends). In the present invention, we achieve highly available transaction recovery of a server within a cluster by migrating the Transaction Recovery Service to another available server in the same cluster. This allows the backup server to read the transaction log and perform recovery on the behalf of the failed server.

Transaction Recovery Service depends on the migratable service framework for manual and automatic migration support. JMS backends, which are XA resources, in turn depend on Transaction Recovery Service migration to recover their resources when they are migrated.

1.2 Product Functions

Manual migration (both fail-over and fail-back) of Transaction Recovery Service within cluster Automatic migration (both fail-over and fail-back) of Transaction Recovery Service within cluster Note that this function is contingent upon automatic migration support from the migratable service framework.

Configuration, manual migration, and monitoring of Transaction Recovery Service 1.3 User Characteristics and Impact (Usability—Use Cases/user Interactions)

Administrators can configure, manually migrate and monitor Transaction Recovery Services via either the Administration Console or the JMX API. Manual Migration 2.1 Functional Description Administrators can manually migrate the Transaction Recovery Service of a failed server (i.e. the original server) to another available server in the same cluster. Before the original server restarts, the administrator may also need to manually migrate the Transaction Recovery Service back to the original server.

Manual migration is recommended if the server has failed and is not expected to be restarted soon. In the absence of migration, a server will perform its own transaction recovery when it is restarted after a failure.

2.2 Functional Requirements 2.2.1 Manual Migration Scenarios

There are two aspects of manual migration: fail-over and fail-back.

2.2.1.1 Fail-Over

When a clustered server (Transaction Coordinator) fails, the Transaction Recovery Service associated with the failed server (i.e. the original server) can be manually migrated to another available server (the backup server) in the same cluster, via either the Administration Console or the JMX API. Please refer to [5] for description of the JMX API for manual migration. During the migration, the migratable service framework activates the Transaction Recovery Service on the backup server. During activation, the Transaction Recovery Service reads the transaction log of the failed server and initializes the transaction recovery asynchronously. Meanwhile, the backup server's own transaction manager functions (accepting new transactions and performing its own transaction recovery) as usual. Note that there may be more than one instances of Transaction Recovery Service (that originates from different servers) activated on a backup server at the same time.

Similar manual migration can also be performed to migrate the Transaction Recovery Service to another available backup server if a backup server fails before completing the transaction recovery actions for the original server.

2.2.1.2 Fail-Back

Fail-back happens when migrating the Transaction Recovery Service from a backup server to the original failed server. Note that fail-back is implicit and does not require administrator intervention unless a migration error occurs, as described below.

2.2.1.2.1 Fail-Back When Recovery is Done

When a backup server finishes transaction recovery before the original server restarts, it gives up ownership of the Transaction Recovery Service and migrates it back implicitly to the original server. No administrative action is needed in this case. Subsequently, when the original server restarts, it regains ownership of its Transaction Recovery Service. However, it does not need to do further recovery work.

2.2.1.2.2 Fail-Back Before Recovery is Done

When the resources to be recovered are not available, transaction recovery for the original server may not be finished when the original server is to be restarted. In this case, the backup server, on detecting that the original server is coming up, suspends the ongoing transaction recovery, performs some internal cleanup, and implicitly migrates the Transaction Recovery Service back to the original server. No administrative action is needed in this case. The original server, once it regains the ownership of its Transaction Recovery Service, restarts successfully and finishes the remaining transaction recovery work.

If the backup server fails to implicitly migrate back to the original server, the original server will fail to boot. In this case, the administrator needs to manually migrate the Transaction Recovery Service from the backup server to the original server before rebooting the original server. During the manual migration, the migratable service framework deactivates the Transaction Recovery Service on the backup server. The deactivation suspends the transaction recovery, performs some internal cleanup and gives up ownership of the Transaction Recovery Service. Subsequently, when the original is restarted, it regains ownership of its Transaction Recovery Service and finishes the remaining transaction recovery work.

Automatic Migration 3.1 Functional Description

Under automatic migration, no administrator intervention is needed, and the migration of Transaction Recovery Service happens transparently under the control of migratable service framework.

3.2 Functional Requirements 3.2.1 Automatic Migration Scenarios

There are two aspects of automatic migration: fail-over and fail-back.

3.2.1.1 Fail-Over

When the migratable service framework detects that a clustered server (Transaction Coordinator) has failed, it automatically migrates the Transaction Recovery Service associated with the failed server to the next available server (the backup server) in the preferred server list of the migratable target MBean. During the migration, the migratable service framework activates the Transaction Recovery Service on the backup server. During activation, the Transaction Recovery Service reads the transaction log of the failed server and initializes the transaction recovery asynchronously. Meanwhile, the backup server's own transaction manager (including its own transaction recovery) functions as usual.

Similar automatic migration sequences can also happen to migrate the Transaction Recovery Service to another backup server if a backup server fails before completing the transaction recovery actions.

3.2.1.2 Fail-Back

This happens when migrating the Transaction Recovery Service from a backup server to the original failed server. There are also two cases:

3.2.1.2.1 Fail-Back without Automatic Migration

This is similar to fail-back when recovery is done for manual migration as described above in Section 3.2.1.2.1.

When a backup server finishes transaction recovery before the failed server restarts, it gives up ownership of the Transaction Recovery Service and migrates it back implicitly to the failed server.

Subsequently, when the failed server restarts, it regains ownership of its Transaction Recovery Service. However, it does not need to do further recovery work.

3.2.1.2.2 Fail-Back with Automatic Migration

This happens if the backup server has not finished transaction recovery when the original server restarts. In this case, the backup server, on detecting that the original server is coming up, suspends the ongoing transaction recovery, performs some internal cleanup, and gives up the ownership of the Transaction Recovery Service of the original server. The migratable service framework will then transparently migrate the Transaction Recovery Service back to the original server. The original server, once it regains the ownership of the Transaction Recovery Service, restarts successfully and finishes the remaining transaction recovery work.

4. Administrative Requirements

Administrative means will be provided to configure, migrate and monitor Transaction Recovery Services.

4.1.1 Administration/Monitoring/Tuning Requirements (e.g. Console, System Admin)

4.1.1.1 Configuring Transaction Recovery Service

Each server in a cluster is associated with a Transaction Recovery Service, and each Transaction Recovery Service is associated with a Migratable Target. If the Transaction Recovery Service is not configured for a particular server, no migration will be enabled. In this case, if the server fails, transaction recovery will only be performed after it restarts.

4.1.1.1.1 Configuring Transaction Recovery Service via the Console

A new JTA Recovery tab for the server will be provided, from which administrators can specify various attributes of the Migratable Target and perform manual migration of the Transaction Recovery Service associated with the server.

4.1.1.1.2 Configuring Transaction Recovery Service via config.xml

Administrators can configure a JTAMigratableTarget element for a clustered server. Please refer to [5] for detailed information about configuring migratable targets in general.

The following is an example of the JTAMigratableTarget configuration:

```
<Server Name="server1" Cluster="mycluster" ListenAddress="campton-1" ListenPort="7001">
<JTAMigratableTarget   Name="server1"   ConstraintedCandidateServers="server1,server2"
/></Server>
```

4.1.1.3 Monitoring JTA Recovery Service

Each server maintains runtime information of all Transaction Recovery Service instances that it hosts. The runtime information is available from a new JTA runtime MBean: JTARecoveryRuntimeMBean, which can be obtained from the existing JTARuntimeMBean MBean.

Two new methods are added to the existing JTARuntimeMBean MBean to provide access to the JTARecoveryRuntimeMBean:

JTARecoveryRuntimeMBean[ ] getRecoveryRuntimeM-Beans( )

This method returns an array of JTARecoveryRuntimeMBean MBeans that corresponds to the Transaction Recovery Service instances that are deployed on the current server.

JTARecoveryRuntimeMBean   getRecoveryRuntimeM-Bean(String serverName)

This method returns the JTARecoveryRuntimeMBean MBean that is associated with the specified server. If the corresponding JTARecoveryRuntimeMBean MBean is not deployed on this server, null is returned.

The JTARecoveryRuntimeMBean MBean has the following methods:

boolean isActive( )

This returns whether the Transaction Recovery Service is currently activated on the server.

int getInitialRecoveredTransactionTotalCount( )

This returns the total number of transactions that are read from the transaction log by the Transaction Recovery Service. The administrator may use this information to increase the value of the MaxTransactions attribute of the JTAMBean MBean as appropriate.

int getRecoveredTransactionCompletionPercent( )

This returns the percentage of the recovered transactions that are completed by the Transaction Recovery Service.

Note that the name of the JTARecoveryRuntimeMBean MBean is the name of the original server of the Transaction Recovery Service.

What is claimed is:

1. A transaction recovery system comprising: a first server; said first server having a memory; said memory of said first server comprising: a first server instance having transaction recovery functionality, the first server instance owning a first transaction log; a second server; said second server having a memory; said memory of said second server comprising: a second server instance having transaction recovery functionality, the second server instance owning a second transaction log; and a shared memory, the first transaction log and the second transaction log residing on the shared memory, wherein normally the first server instance coordinates at least one transaction from the first transaction log and wherein, upon the failure of the first server instance, the second server instance coordinates the at least one transaction from the first transaction log.

2. The transaction recovery system of claim 1, wherein the second server instance coordinates one or more transactions from the second transaction log, and wherein, upon failure of the second server instance, the first server instance coordinates the one or more transactions from the second transaction log.

3. The transaction recovery system of claims 1, wherein the first server instance has a first transaction recovery service that is migrated to the second server instance.

4. The transaction recovery system of claim 3, further including an input apparatus, the input apparatus operable to allow a user to input a migrate command to initiate the failover migration.

5. The transaction recovery system of claim 3, wherein the first transaction recovery service is configured to be moved from the first server instance to the second server instance and activated on the second server instance.

6. The transaction recovery system of claim 3, wherein the first transaction recovery service is configured to failback migrate from the second server instance to the first server instance upon detecting the startup of the server instance startup.

7. The transaction recovery system of claim 6, wherein the first transaction recovery service is configured to be deactivated, moved from the second server instance to the first server instance, and activated on the first server instance.

8. The transaction recovery system of claim 1, further comprising a migratable framework and a transaction recovery service, the first server instance and the second server instance configured to operate in conjunction with the migratable framework.

9. The transaction recovery system as claimed in claim 8, wherein the migratable framework is configured to automatically failover migrate a first transaction recovery service from the first server instance to the second server instance.

10. The transaction recovery system as claimed in claim 9, wherein the migratable framework is configured to automatically failback migrate the first transaction recovery service from the second server to the first server when the second server has completed coordinating transactions from the first transaction log.

11. The transaction recovery system as claimed in claim 9, wherein the migratable framework is configured to automatically failback migrate the first transaction recovery service from the second server to the first server when the first server has restarted.

12. The transaction recovery system of claim 1, wherein the first server instance, the second server instance, and the shared memory reside on a single cluster.

* * * * *

UNITED STATES PATENT AND TRADEMARK OFFICE
CERTIFICATE OF CORRECTION

PATENT NO. : 7,380,155 B2 Page 1 of 1
APPLICATION NO. : 11/673727
DATED : May 27, 2008
INVENTOR(S) : Fung et al.

It is certified that error appears in the above-identified patent and that said Letters Patent is hereby corrected as shown below:

In column 16, line 55, in claim 3, delete "claims" and insert -- claim --, therefor.

Signed and Sealed this

Ninth Day of February, 2010

David J. Kappos
*Director of the United States Patent and Trademark Office*